(12) United States Patent
Asbille

(10) Patent No.: US 10,336,359 B1
(45) Date of Patent: Jul. 2, 2019

(54) LOW PROFILE TABLE BASE SYSTEM

(71) Applicant: Tony Asbille, Texarkana, AR (US)

(72) Inventor: Tony Asbille, Texarkana, AR (US)

(*) Notice: Subject to any disclaimer, the term of this patent is extended or adjusted under 35 U.S.C. 154(b) by 0 days.

(21) Appl. No.: 16/002,492

(22) Filed: Jun. 7, 2018

Related U.S. Application Data

(60) Provisional application No. 62/516,267, filed on Jun. 7, 2017.

(51) Int. Cl.
  *B62B 5/04* (2006.01)
  *B62B 3/00* (2006.01)
  *F16D 65/28* (2006.01)
  *F16D 63/00* (2006.01)
  *F16D 127/06* (2012.01)
  *F16D 121/14* (2012.01)
  *F16D 125/28* (2012.01)

(52) U.S. Cl.
  CPC ............. *B62B 5/049* (2013.01); *B62B 3/008* (2013.01); *B62B 5/0433* (2013.01); *B62B 5/0457* (2013.01); *F16D 63/006* (2013.01); *F16D 65/28* (2013.01); *F16D 2121/14* (2013.01); *F16D 2125/28* (2013.01); *F16D 2127/06* (2013.01)

(58) Field of Classification Search
  CPC ...... B62B 5/049; B23D 47/02; B23D 45/044; B23D 59/003; B23D 47/025; B23D 45/048; B23D 59/006; B23D 45/021; B23D 47/04; B23D 47/126; B23D 59/00; B23D 59/001; B23D 45/068; B23D 47/12
  See application file for complete search history.

(56) References Cited

U.S. PATENT DOCUMENTS 6,843,625 B2 * 1/2005 Hewitt ............... B60P 7/08
                                      280/763.1

* cited by examiner

*Primary Examiner* — James A Shriver, II
*Assistant Examiner* — James J Triggs
(74) *Attorney, Agent, or Firm* — Michael D. Eisenberg

(57) ABSTRACT

A table base system includes a platform extending from a first end to a second end; a first braking apparatus connected to the platform at the first end, the braking apparatus having a mechanical cam; a spring to aid in retaining the braking apparatus in a locked position; and a lever to move the mechanical cam; the lever is accessible from a top of the platform; and the braking apparatus is engaged via pressure applied to the lever.

11 Claims, 5 Drawing Sheets

LOW PROFILE TABLE BASE SYSTEM

BACKGROUND

1. Field of the Invention

The present invention relates generally to table base systems and table systems, and more specifically, to a low profile table base system with a locking mechanism integrated into the base.

2. Description of Related Art

Tables and table base systems are well known in the art and are effective means to provide platforms for moving items, working surfaces, etc. Some tables have the ability to be transported via one or more wheels.

One of the problems commonly associated with mobile table systems is inconvenient locking mechanisms. For example, locking devices may be integrated within wheels, thereby requiring the user to tediously manipulate the locking device in order to lock the table in place.

In addition, many tables with locking mechanism sit at an inconvenient height above the ground.

Accordingly, although great strides have been made in the area of tables and table base systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
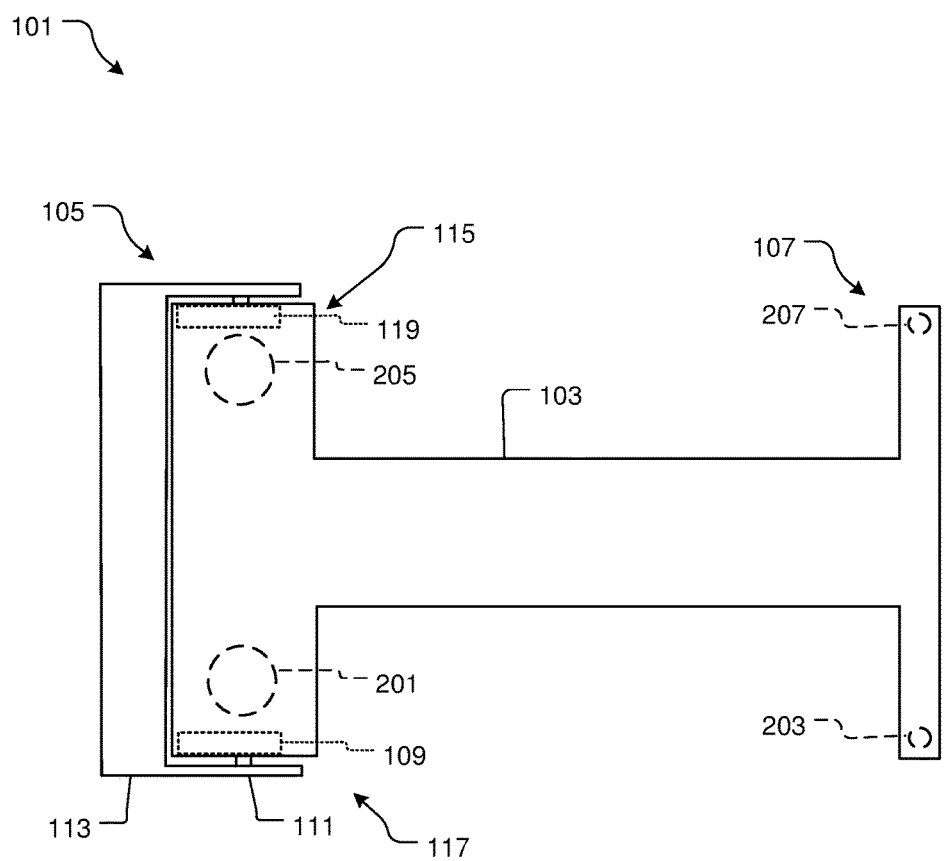
FIG. 1 is a top view of a table base system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional table base systems. Specifically, the present invention provides a low profile table base with a locking mechanism configured to conveniently engaged from a top of the table base. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a top view of a table base system 101 in accordance with a preferred embodiment of the present application. It will be appreciated that system 101 overcomes one or more of the above-listed problems commonly associated with conventional table base systems.

In the contemplated embodiment, system 101 includes a platform 103 extending from a first end 105 to a second end 107. It should be appreciated that platform 103 can vary in size and shape as desired for aesthetical, functional, or manufacturing considerations. System 101 further includes a breaking apparatus 109 extending away from platform 103. Breaking apparatus 109 is configured to engage via a lever 111. In the preferred embodiment, a foot pedal 113 is attached to lever 111 and extends across the top of platform 103, thereby being accessible from a first side 115 and a second side 117. It should be appreciated that an additional breaking apparatus 119 can be positioned opposite the first.

Figure 2A:
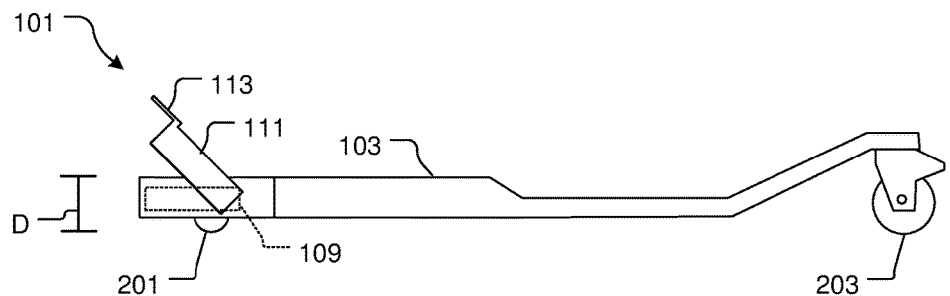
FIGS. 2A and 2B are side view of the table base system of FIG. 1.
Figure 2B:
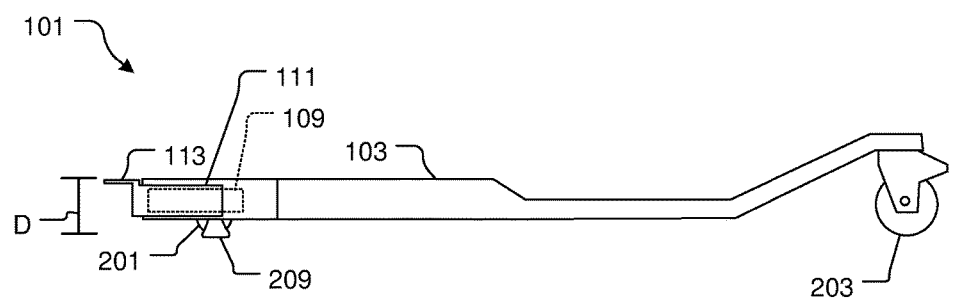

In FIGS. 2A and 2B, side views of system 101 are shown. System 101 can include a plurality of wheels 201, 203, 205, 207 extending from platform 103, thereby allowing for system 101 to be mobile. As further shown, one lever 111 rotates to engage breaking apparatus 109, which is configured to extend and retract a foot 209 to the ground. When in a locked position, as shown in FIG. 2B, pedal 113 is level with platform 103. In one embodiment, platform 103 is approximately 3 inches from a ground surface (D), thereby creating a low profile table base system. It should be appreciated that system 101 is thereby a low profile locking base.

It should be appreciated that one of the unique features believed characteristic of the present application is breaking apparatus 109. It should be appreciated that breaking apparatus 109 uses a mechanical cam system and a spring, to easily allow for a user to lock system 101 in place via pedal 113.

Figure 3A:
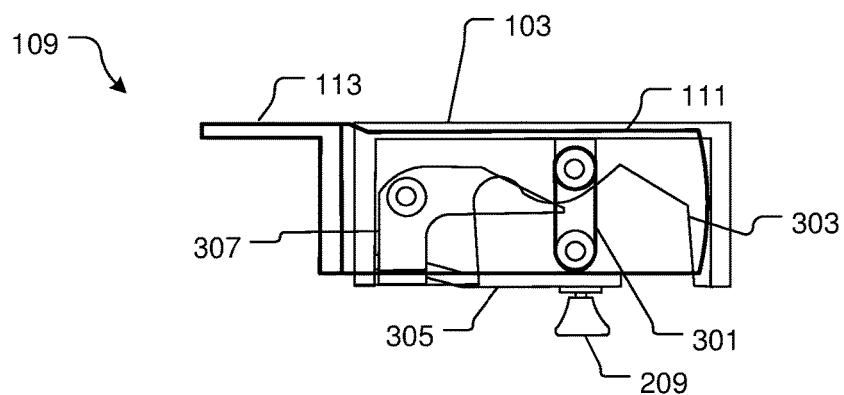
FIGS. 3A and 3B are side views of the locking mechanism of FIG. 1.
Figure 3B:
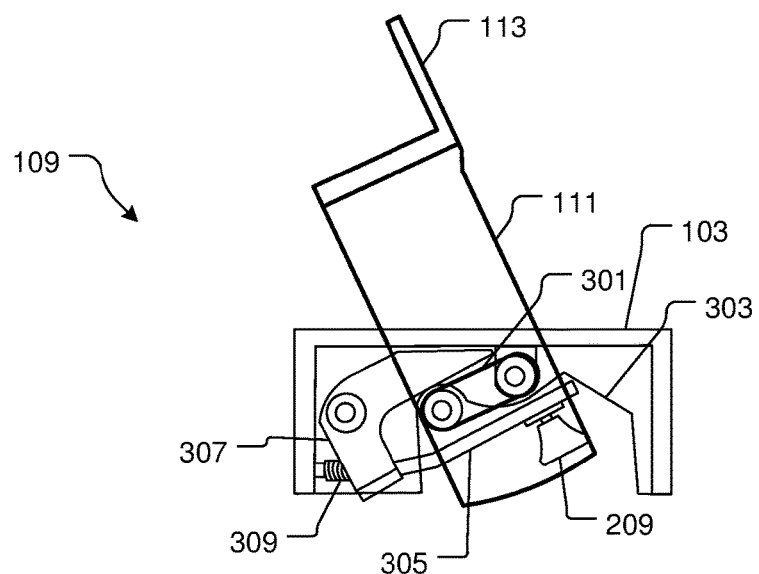

In FIGS. 3A and 3B, side views demonstrate the inner functional workings of a contemplated embodiment of breaking apparatus 109. Lever 111 engages with a mechanical cam 301. During use, movement of lever 111 moves cam 301 along a track 303. Movement of cam 301 causes foot 209 to extend and contract via an arm 305 and a hinging apparatus 307. As further shown, a spring 309 is positioned within breaking apparatus 109 to further aid in retaining apparatus 307 in a locked position. It should be appreciated that the particular elements of apparatus 307 can vary in size, shape, and dimensions while maintaining the same functionality.

Figure 4A:
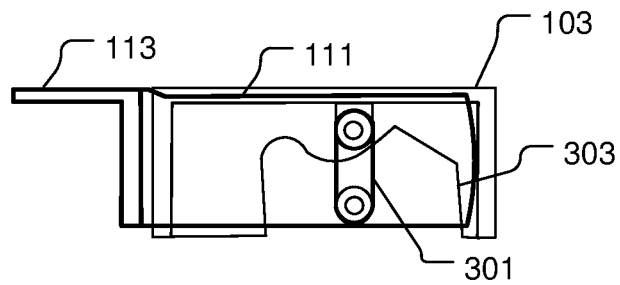
FIGS. 4A and 4B are side views of a cam and lever of FIGS. 3A and 3B.
Figure 4B:
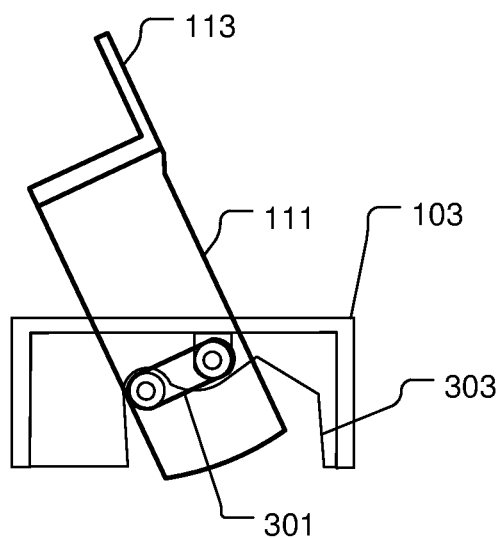
Figure 5A:
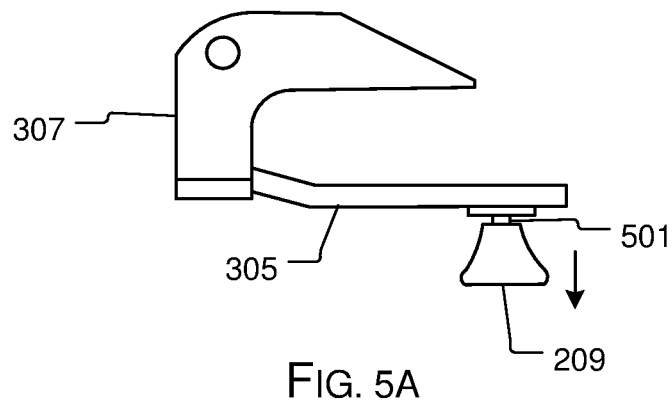
FIGS. 5A and 5B are side views of a foot from FIGS. 3A and 3B.
Figure 5B:
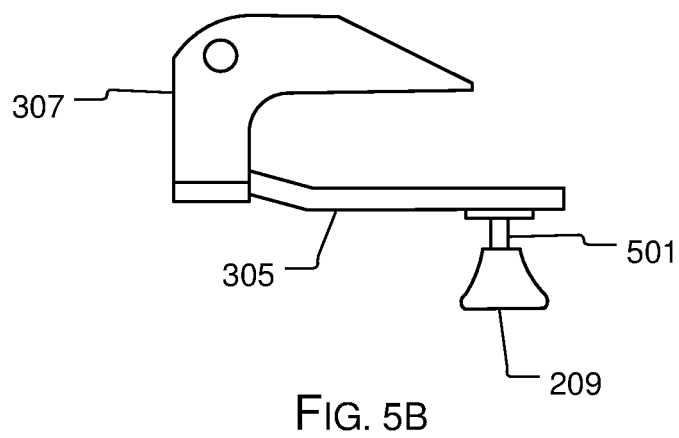

FIGS. 4A and 4B show side views of lever 111 engaging cam 301 along track 303 separately from the other elements of the breaking apparatus. Similarly, FIGS. 5A and 5B demonstrate foot 209 attached to arm 305 and hinging apparatus 307. It is contemplated that foot 209 can be secured to arm 305 via a self leveling rod 501, thereby providing a means for platform 103 to remain level on an uneven ground.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A table base system, comprising:
   a platform extending from a first end to a second end;
   a first braking apparatus connected to the platform at the first end, the braking apparatus having:
      a body forming an inner area;
      a mechanical cam disposed within the inner are, the mechanical cam extending from a first cam end to a second cam end, the first cam end is pivotally attached to the body;
      a spring configured to aid in retaining the braking apparatus in a locked position;
      an arm pivotally attached to the spring and disposed within the inner area;
      a foot secured to the arm, the foot is configured to extend at a position outside the inner area; and
      a lever configured to move the mechanical cam;
   wherein the lever is accessible from a top of the platform; and
   wherein the braking apparatus is engaged via pressure applied to the lever.

2. The system of claim 1, further comprising:
   one or more wheels extending from a bottom of the platform.

3. The system of claim 1,
   wherein the arm is engaged with the spring and the mechanical cam; and
   wherein activation of the mechanical cam causes the foot to extend to the ground via the arm and the spring.

4. The system of claim 3, wherein the foot is secured to the arm via an extendable rod.

5. The system of claim 4, wherein the extendable rod is a self-leveling rod.

6. The system of claim 1, wherein the first braking apparatus further comprises:
   a brake pedal extending from a first side of the first end to a second side of the first end;
   wherein the brake pedal is secured to the lever at the first side; and
   wherein the brake pedal becomes level with the platform when in a locked position.

7. The system of claim 6, further comprising:
   a second breaking apparatus positioned on the second side of the first end; and
   wherein the brake pedal is in communicate with the second breaking apparatus via a second lever; and
   wherein the breaking apparatus and second breaking apparatus is locked via the first side or the second side.

8. The system of claim 1, wherein the platform has a flat top surface.

9. The system of claim 1, wherein the platform is positioned less than 8 inches from the ground surface.

10. The system of claim 1, wherein the first locking mechanism is configured to remain locked until acted upon by pressure.

11. The system of claim 1, wherein the first end is elevated approximately 3 inches above the ground surface.

* * * * *